2,978,318

METHOD OF PRODUCING STEEL FROM PULVERULENT IRON PRODUCTS RICH IN CARBON

Bo Michael Sture Kalling, Domnarvet, and Folke Karl Evald Johansson, Hallsjogarden, Borlange, Sweden, assignors to Stora Kopparbergs Bergslags Aktiebolag, Falun, Sweden, a company of Sweden No Drawing. Filed June 30, 1958, Ser. No. 745,324

Claims priority, application Sweden July 15, 1957

7 Claims. (Cl. 75—43)

In the reduction of iron ore without simultaneous smelting of the same, a fine grained product is obtained in certain methods. This is the case, inter alia, in processes based on the reduction of fine grained iron ores at so low a temperature that sintering or baking of the material may be prevented during the reduction. For example, it will be possible in a fluidized bed, as according to the British Patent No. 747,584 or in some other way, for instance in a rotation method, as according to the U.S. patent application No. 647,989 and with carbon monoxide as the main reducing agent, to carry the reduction into effect already at a temperature of approximately 600° C., although a certain difficulty may be experienced in attaining a complete reduction of the ore. However, particularly at the high degrees of reduction, the product attains an appreciable percentage of carbon substantially bonded to the iron in the form of iron carbide. Carbon contents up to 6% may occur in the form of carbide. In addition, there is frequently a not inconsiderable percentage of carbon in a free state in the product, which is obtained through the splitting of carbon monoxide into carbon and carbon dioxide. Also in other reduction methods, a fine grained product may be obtained with a varying degre of reduction and a relatively high carbon content at the same time.

However, the transfer of such a pulverulent iron product into molten steel is connected with great difficulties in conventional steel smelting methods. In order to make feasible the smelting in an open hearth furnace, it is necessary that on beforehand the product be briquetted or agglomerated in another way. This is an expensive procedure, however, and, especially in connection with carbonaceous products, it is difficult to perform since the carbon impairs the binding capacity, whether it occurs as carbide or in the free state. Nor is the electro steel furnace suitable for the smelting of pulverulent products, and particularly not, if the reduction of the ore has been incomplete. An augmented power consumption will then be obtained, and a development of gas, principally of carbon monoxide, will set in, which is annoying in carrying the process into effect. It is true that it is not inconceivable in the ordinary Bessemer and Thomas processes to smelt in given quantities of iron powder of this kind during the operation of the process in order to utilize the excess heat that may be rendered in the process, but such quantities may be added to a percentally small extent only.

Now, the invention has for its object at a good economy and with no or only a small amount of additional fuel to produce steels from difficultly fusible iron materials of a comparatively high percentage of carbon and possibly holding not inconsiderable quantities of iron oxides.

In the method according to the invention, the carbonaceous finely divided iron material is introduced into a furnace charged beforehand with molten iron or steel and being of the type where the molten material is maintained in a preferably rolling motion by mechanical means, and wherein a gas, which is rich in oxygen, is blown in, preferably in a direction against the molten bath, which is stirred so effectively that the carbon of the material is burned substantially into carbon dioxide in the furnace. The method is performed with particular advantage in a rotary furnace which is kept more or less inclined to the horizontal, preferably at an angle falling below 45°. The pulverulent material is preferably supplied successively and, in a rotary furnace, on the side thereof where the furnace wall merges into the bath. Furnaces where the charge is maintained in motion by shaking or centrifugation may also be taken into consideration. The iron powder is thus smelted into an already molten steel or pig iron bath, wherein carbon present in the product is consumed as fuel and reducing agent to complete the reduction of the iron powder. In order that the process shall permit of being carried out at a good heat economy and without any essential quantities of additional fuel having to be supplied for the performance of the smelting procedure, it is a condition, however, that the carbon present is burned more or less completely into carbon dioxide. It has been found that the quantity of carbon required for smelting a product reduced to 85% in a furnace of this type only amounts to about 10% counted per ton of steel produced. If the carbon content of the iron powder is lower, additional carbon might require to be added. This may take place for instance in the form of coke fines, which, however, involves an increase of the sulphur content of the steel. It is, of course, also possible to supply a certain quantity of fuel by adding pig iron, the alloying constituents of which burn and thereby increase the production of heat, but no more than parts, for instance 1 part of pig iron on 3 parts of iron powder. The most favourable conditions are obtained, however, if the own carbon content of the iron powder becomes so high in the production of the same that it suffices, at least substantially, as a fuel and reducing agent for carrying the process into effect. An important fact is that this carbon does not convey any additional sulphur to the steel process.

An example of carrying out the invention is the following.

The smelting is accomplished in a rotary furnace having a horizontal or preferably a somewhat inclined axis. The furnace is provided with a central opening at one end thereof, through which the charging takes place and the oxygen gas is supplied through a tuyere adapted to direct the oxygen gas against the surface of the molten iron bath in the furnace or in the process, for instance in the manner described in the British Patent No. 759,224. The speed of rotation of the furnace may vary but should be relatively high, in order that the mixing shall become sufficient, for instance 25–30 revolutions per minute. In the tapping of the preceding charge, a given quantity of molten steel is retained, and/or a small quantity of molten pig iron or steel is supplied—preferably altogether approximately ⅓ of the total weight of the charge.

The fine grained iron material to be smelted down is constituted of a powder consisting substantially of iron carbide produced by the reduction of fine grained ore at a low temperature with carbon monoxide. The product, which contains 85% $Fe_3C$, 5% Free C, 5% FeO and 5% gangue, is charged in various rounds. Upon each admixture the furnace is brought into rotation, and oxygen gas is supplied over the surface of the bath. The oxygen gas then burns both the carbon monoxide obtained through the accomplishment of the reduction of the material and the principal part of the remaining carbon into carbon dioxide, and the heat then generated will then be sufficient for the smelting and desired superheating of the steel produced. The charging of the raw materials may also take place continuously as the process proceeds, said material being then preferably supplied at the downwardly moving side of the layers to lessen the risk of reoxidation. It might be found suitable to add a relatively large quantity prior to the commencement of the blowing procedure and then to continue the charging in a continuous manner.

To make the smelting take place with a minimum loss of iron in the slag and at the same time with a high percentage of $CO_2$ in the gas, the speed of rotation of the furnace must be high, at least over 10 revolutions per minute.

When the smelting is terminated, it remains to see to it that the proper temperature and carbon content is attained on the steel bath prior to tapping, which may be effected in a manner known per se.

What is claimed is:

1. Method of producing a melt of iron and steel in a compact state from a pulverulent iron material rich in carbon and containing iron oxides remaining from an incomplete ore reduction, which comprises the steps consisting of precharging a furnace with molten ferrous metal to form a molten bath therein, stirring the charge of molten ferous metal by mechanical means, and during the run of the procedure substantially continuously introducing the pulverulent iron material into the bath, the intensity of said stirring being such that said material is reduced and carbon monoxide is generated whilst simultaneously blowing into the furnace an oxygen-rich gas in quantity sufficient to burn said carbon monoxide to carbon dioxide and to keep the material in molten state, the intensity of said stirring being such that the carbon of the material is burned substantially into carbon dioxide in the furnace.

2. A method according to claim 1, characterized in that the procedure is carried out in an inclined rotary furnace, which is rotated with the axis of rotation at an inclination less than 45° to the horizontal.

3. A method according to claim 1 characterized in that said molten ferrous metal is pig iron, and in that 1-3 parts of pig iron are introduced into the furnace for each 3 parts of iron material.

4. A method according to claim 1, characterized in that the iron material has a carbon content so high as to be sufficient for generating all of the heat necessary for smelting and superheating the charge.

5. A method according to claim 1, characterized in that the furnace is precharged with molten iron or steel to approximately ⅓ of the normal charge.

6. A method according to claim 2, characterized by the iron material being supplied, in successive increments, at the downwardly moving part of the furnace wall, which at the rotation just enters into contact with the molten bath.

7. A method according to claim 2, characterized in that the furnace is rotated at a speed of at least 10 revolutions per minute.

References Cited in the file of this patent

UNITED STATES PATENTS

| | | |
|---|---|---|
| 2,598,393 | Kalling et al. | May 27, 1952 |
| 2,674,531 | Udy | Apr. 6, 1954 |
| 2,750,276 | Marshall | June 12, 1956 |
| 2,806,779 | Case | Sept. 17, 1957 |